(12) United States Patent
He et al.

(10) Patent No.: US 11,970,940 B1
(45) Date of Patent: Apr. 30, 2024

(54) INDUCED EARTHQUAKE EVALUATION METHOD FOR HYDRAULIC FRACTURING ACTIVATED FAULTS

(71) Applicants: Chongqing Institute of Geology and Mineral Resources, ChongQing (CN); Chongqing Huadi Resources Environment Technology Co., LTD, ChongQing (CN)

(72) Inventors: Pei He, ChongQing (CN); Ye Zhang, ChongQing (CN); Jinxi Wang, ChongQing (CN); Jianqiang Zhang, ChongQing (CN); Jiankun Zhou, ChongQing (CN); Xiaozhong Guo, ChongQing (CN); Yanling Huang, ChongQing (CN); Liming Ouyang, ChongQing (CN)

(73) Assignees: Chongqing Institute of Geology and Mineral Resources, ChongQing (CN); Chongqing Huadi Resources Environment Technology Co., LTD, ChongQing (CN)

( * ) Notice: Subject to any disclaimer, the term of this patent is extended or adjusted under 35 U.S.C. 154(b) by 0 days.

(21) Appl. No.: 18/475,393

(22) Filed: Sep. 27, 2023

(30) Foreign Application Priority Data

Jan. 6, 2023 (CN) .................. 202310016875.X (51) Int. Cl.
*E21B 43/26* (2006.01)
*E21B 49/00* (2006.01)
*G01V 1/01* (2024.01)

(52) U.S. Cl.
CPC ............ *E21B 49/005* (2013.01); *E21B 43/26* (2013.01); *G01V 1/01* (2024.01)

(58) Field of Classification Search
CPC .... E21B 43/26; E21B 49/008; E21B 2200/20; G01V 1/01
See application file for complete search history.

(56) References Cited

U.S. PATENT DOCUMENTS 5,771,170 A * 6/1998 Withers .................. G01V 1/50
702/14
5,963,508 A * 10/1999 Withers ................. G01V 1/288
166/250.1

(Continued)

FOREIGN PATENT DOCUMENTS

CN    116307683 B  *  8/2023
CN    116625837 A  *  8/2023

OTHER PUBLICATIONS

Chongqing Institute of Geology and Mineral Resources and Chongqing Huadi Zihuan Technology Co., Ltd (Applicants), Preliminary Amendment for CN202310016875.X, w/ (allowed) replacement claims, Jul. 13, 2023.

(Continued)

*Primary Examiner* — Kenneth L Thompson (57) ABSTRACT

An induced earthquake evaluation method for hydraulic fracturing activated faults includes obtaining an induced earthquake evaluation unit, cumulative injection equivalent energy, induced earthquake probability of fault type, induced earthquake probability of fault distance, hydraulic fracturing fluid diffusion capacity in fractured formation, new effective fault stress after fracturing, formation fluid pressure change rate and cumulative released equivalent energy. The probability of induced earthquake by hydraulic fracturing can be obtained. The induced earthquake possibility of each evaluation unit or single well under different stages of hydraulic fracturing, different construction injection methods and production conditions can be quantitatively evaluated. The method provides a quantitative result (Continued)

that can provide data support for optimizing hydraulic fracturing and reducing induced earthquake hazards.

5 Claims, 2 Drawing Sheets

(56) References Cited

U.S. PATENT DOCUMENTS

| | | | | |
|---|---|---|---|---|
| 6,389,361 | B1* | 5/2002 | Geiser | G01V 1/288 |
| | | | | 702/15 |
| 8,041,510 | B2* | 10/2011 | Dasgupta | G01V 1/288 |
| | | | | 702/14 |
| 10,810,331 | B2* | 10/2020 | Umholtz | G06F 30/20 |
| 11,506,814 | B2* | 11/2022 | Su | G01V 20/00 |
| 2016/0018542 | A1* | 1/2016 | Maerten | G01V 20/00 |
| | | | | 702/16 |

OTHER PUBLICATIONS

CNIPA, Notification to grant patent right for invention in CN202310016875.X, Jul. 16, 2023.

* cited by examiner

INDUCED EARTHQUAKE EVALUATION METHOD FOR HYDRAULIC FRACTURING ACTIVATED FAULTS

TECHNICAL FIELD

The invention belongs to the field of safety production engineering technology and earthquake risk evaluation, and particularly relates to an induced earthquakes evaluation method for hydraulic fracturing activated fault.

BACKGROUND

Hydraulic fracturing is an important technology to improve the permeability of tight reservoir. It relies on hydraulic energy to crack rocks to form new channels and connect closed channels to improve the permeability of the original formation. It is widely used in oil and gas reservoir reconstruction, geothermal resource development and wastewater reinjection. This technology has greatly helped to improve production efficiency, but it also brings a series of problems. For example, when injected water cracks rocks, it will increase pore pressure in rocks, and flow into new channels, causing large rock fractures or activating surrounding faults to induce earthquakes. It brings a lot of problems to production safety and social stability.

At present, a large number of media and literature have reported the fact that hydraulic fracturing may induce earthquakes. Some patents also publish some test or evaluation methods of water-induced earthquakes. The patent CN113376684B discloses an experimental method for studying the process of water-induced earthquake fault rupture. By making a fault model and experimental method, water injection experiment is carried out in the fault plane under the biaxial loading system, the whole process of induced earthquake from gestation to instability rupture can be completely seen, and the characteristics of water-induced earthquake under different water injection conditions can be studied. The patent CN112461668A published a test method for studying hydraulic fracturing induced fault activation. By making a crack in the rock sample, filling materials in the crack, and conducting hydraulic fracturing tests under true triaxial confining pressure, the influence and mechanism of different filling materials and fracturing parameters on water-injection induced earthquakes can be discussed. The patent CN115201898A publishes a 3D numerical simulation method and system for fracture-slip of earthquake faults induced by injection-production. It includes the construction of 3D water injection geometry model, 3D water force bidirectional coupling numerical model and 3D local fault model. It can calculate the friction coefficient and shear stress in the whole process of earthquake caused by fault slip, simulate the friction and slip process of 3D local fault model, and evaluate the induced fault earthquake. In addition, patents CN109630011A and CN106971269A respectively publish a method for the prevention and evaluation of induced earthquakes by water injection or carbon dioxide injection. However, the above or already published evaluation methods on hydraulic fracturing activated fault-induced earthquakes are only evaluation techniques from one point or one perspective. They only represent a class of technical routes, which have their own advantages but also their limitations, and are mainly suitable for laboratory experiment evaluation. In particular, it is not suitable for quantitative evaluation of the hydraulic fracturing induced earthquake risk of a working block in production. In addition, there are many reasons for induced earthquake by hydraulic fracturing, such as induced earthquake by rising pore pressure of rock fluid, activated fault or sudden pressure relief of rock layer.

Therefore, the invention provides an evaluation method for induced earthquake by hydraulic fracturing activated fault, aiming at the production and safety risks caused by hydraulic fracturing injected fluid.

SUMMARY

Aiming at the existing problems and shortcomings, the invention provides an induced earthquake evaluation method for hydraulic fracturing activated faults, which can realize the evaluation of the risk of induced earthquake by activation of surrounding faults during hydraulic fracturing construction. It can obtain quantitative and dynamic risk results, and guide the prevention and control of safe production and social stability.

The invention relates to an induced earthquake evaluation method for hydraulic fracturing activated faults, which is realized by the following solutions.

An induced earthquake evaluation method for hydraulic fracturing activated faults, includes the steps S1 to S8.

Step S1, a hydraulic fracturing activated fault-induced earthquake evaluation unit is obtained according to the type of geological structure (i.e., geological structure type), fault distribution, fault size, working area size, injection well distribution, production well distribution, injection and production formations.

Step S2, the cumulative injection equivalent energy W of hydraulic fracturing fluid is obtained according to the injection method, injection form, injection rate and cumulative injection amount of hydraulic fracturing fluid.

Step S3, the induced earthquake probability $P_1$ caused by fault type factors is obtained according to fault type. The induced earthquake probability $P_2$ is determined according to the distance between hydraulic fracturing well and fault.

Step S4, according to rock porosity, comprehensive permeability and fracture development degree of hydraulic fracturing formation, the diffusion capacity D of hydraulic fracturing fluid in fractured formation is obtained.

Step S5, the hydraulic fracturing fluid diffuses over the fault, weakening the effective stress on the fault. The new effective stress $\tau$ is determined according to the fluid pressure and the new mechanical characteristics of the fault.

Step S6, taking the induced earthquake evaluation unit as a whole, the average fluid pressure during injection and the original formation pressure before injection of all hydraulic fracturing injection wells are obtained, and the change rate of formation fluid pressure $\varepsilon$ is obtained.

Step S7, in the induced earthquake evaluation unit, the cumulative equivalent energy released E by hydraulic fracturing is obtained according to the cumulative fluid production time, production mode and production well distribution after hydraulic fracturing.

Step S8, in the induced earthquake evaluation unit, the induced earthquake probability P is obtained according to the cumulative injection equivalent energy W, the induced earthquake probability $P_1$ by fault type, the induced earthquake probability $P_2$ by fault distance, the diffusion capacity D of hydraulic fracturing fluid, the effective fault stress $\tau$, the fluid pressure change rate $\varepsilon$ of formation, and the cumulative released equivalent energy E.

Preferably, in the step S1, the geological structure type chooses one of anticline, syncline, fault structure among the medium structure and the following structure types. The fault distribution is obtained in relation to the relative location of hydraulic fracturing injection wells and production wells. Fault size is obtained by fault grade. The induced earthquake evaluation unit is not larger than the area of the working area, and is mainly distributed in the second and third grade faults of the working area. More than 90% of hydraulic fracturing fluid injection and production wells are located in working area and induced earthquake evaluation unit. The injection and production formations are the same or adjacent connected formation.

Preferably, the cumulative injection method of hydraulic fracturing fluid in step S2 includes continuous injection and intermittent injection. The injection form includes single-well injection and multi-well simultaneous injection. The formula for calculating the cumulative injection equivalent energy W is:

$$W = \sum W_i = \sum (W_{ik} + W_{ip}) = \sum \frac{1}{2}\left[(m_i)\left(\frac{\partial y}{\partial t}\right)^2 + k_i \left(\frac{\partial y}{\partial x}\right)^2\right]$$

Where W is the cumulative injection equivalent energy, $W_{ik}$ is the kinetic energy of the i injected fluid, $W_{ip}$ is the elastic potential energy of the i injected fluid, $m_i$ is the mass of the i injected fluid, $k_i$ is the elastic potential energy coefficient of the i injected fluid.

Preferably, in the step S2, the cumulative injected equivalent energy for continuous injection is multiplied by factor A, and the cumulative injected equivalent energy for simultaneous injection of multiple wells is multiplied by factor B. The formulas for calculating factors A and B are as follows:

$$\begin{cases} A = \dfrac{d}{2\ln^{d+1}} \\ B = \dfrac{n}{\ln^{3n}} \end{cases}$$

Where d is the number of continuous injection days and n is the number of wells injected simultaneously.

Preferably, in the step S3, the induced earthquake probability $P_1$ caused by fault type factors is divided into four categories: Type III fault ($P_1$) greater than Type IV fault ($P_1$) greater than Type II fault ($P_1$) greater than Type I fault ($P_1$). The induced earthquake probability $P_2$ caused by hydraulic fracturing well distance from fault (i.e., the distance between hydraulic fracturing well and fault) is divided into four categories: less than 1 kilometer (km) ($P_2$) greater than 1-3 km ($P_2$) greater than 3-10 km ($P_2$) greater than greater than 10 km ($P_2$). That is, the fault type factors are divided, according to the induced earthquake probability $P_1$, into four categories: type III fault, type IV fault, type II fault and type I fault; an induced earthquake probability of the type III fault greater than an induced earthquake probability of the type IV fault greater than an induced earthquake probability of the type II fault greater than an induced earthquake probability of the type I fault; the distance between hydraulic fracturing well and fault is divided, according to the induced earthquake probability $P_2$, into four categories: a distance less than 1 km, a distance of 1-3 km, a distance of 3-10 km, and a distance greater than 10 km; an induced earthquake probability of the distance less than 1 km greater than an induced earthquake probability of the distance of 1-3 km greater than an induced earthquake probability of the distance of 3-10 km greater than an induced earthquake probability of the distance greater than 10 km.

Preferably, in the step S4, the diffusion capacity of hydraulic fracturing fluid in the fractured formation is obtained by the following formula:

$$D = \frac{M \cdot P_d \cdot K}{\mu_1 (P_d + \alpha^2 M)}$$

Where $$\alpha = 1 - \frac{K_d}{K_g},\ P_d = K_d + \frac{4}{3\mu_d},\ M = \frac{1}{\left(\dfrac{\phi}{K_f} + \dfrac{\alpha - \phi}{K_g}\right)},$$

D is the diffusion capacity, $K_f$ is the injected fluid volume modulus, $K_g$ is the rock skeleton volume modulus, $K_d$ is the rock mineral particle volume modulus, K is the formation rock permeability, $\phi$ is the formation rock porosity, $\mu_d$ is the formation rock skeleton shear modulus, $\mu_1$ is the injected fluid viscosity.

Preferably, in the step S5, the hydraulic fracturing fluid diffuses into the fault. The fluid pressure increases at the fault, the friction factor and the polymerization strength decrease. It results in a change in effective stress. The new effective stress $\tau$ is obtained by the following formula:

$$\tau = \mu(\sigma_n - P) + \tau_0$$

Where $\mu$ is the internal friction factor of the fault, $\sigma_n$ is the vertical pressure of the fault, P is the fluid pressure at the fault, and $\tau_0$ is the fault polymerization strength.

Preferably, in the step S7, the fluid production method includes continuous production and intermittent production, the production speed includes rapid production after hydraulic fracturing injection and slow production after hydraulic fracturing. Production locations include production near faults (less than 3 km) and production away from faults (greater than 3 km). The formula for calculating the cumulative released equivalent energy E is as follows:

$$E = \sum E_i = \sum C_1 \cdot C_2 \cdot C_3 \cdot \int \left(T\frac{\eta}{K_T} - P\right) dV$$

Where $C_1$ is the production mode correction coefficient, $C_2$ is the production speed correction coefficient, $C_3$ is the production location correction coefficient, $\eta$ is the volume expansion coefficient, $K_T$ is the isothermal compression coefficient, T is the temperature, P is the fluid pressure.

Preferably, in the step S8, combining many factors, the induced earthquake probability can be obtained from the following formula:

$$P = f_1(P_1, P_2, \varepsilon) \cdot f_2(W - E, D, \tau)$$

Where $$f_1(P_1, P_2, \varepsilon) = \varepsilon \cdot (P_1 + P_2 + P_1 \cdot P_2) f_2(W - E, D, \tau) = \frac{A_2 D}{\tau} e^{A_1(W-E)},$$

$A_1$ is the equivalent energy correction coefficient, $A_2$ is the hydraulic fracturing fluid diffusion energy correction coefficient in the formation rock.

Compared with the prior art, the invention has the beneficial effect that it provides a new evaluation method for quantifying induced earthquake by hydraulic fracturing through fault activation. It can divide several induced earthquake evaluation units for a specific working area, and quantitatively evaluate the induced earthquake possibility in different hydraulic fracturing stages, different injection methods and production conditions for each evaluation unit or a single well. It can provide the quantified result. According to the requirements of induced earthquake control, the injection-production mode, injection-production quantity and injection-production well distribution of hydraulic fracturing injection and production wells in the evaluation unit can also be deduced. The control measures of fault activation induced earthquakes can be proposed, which can provide data support for optimizing hydraulic fracturing and production conditions to reduce induced earthquake disasters.

DETAILED DESCRIPTION OF EMBODIMENTS

The technical scheme of the invention is further explained in detail in combination with the attached drawings and specific embodiments. It should be understood that the following embodiments are illustrative descriptions and interpretations of the invention only and should not be interpreted as limiting the scope of protection of the invention. All technologies realized based on the above contents of the invention are covered within the scope of protection intended by the invention.

Figure 1:
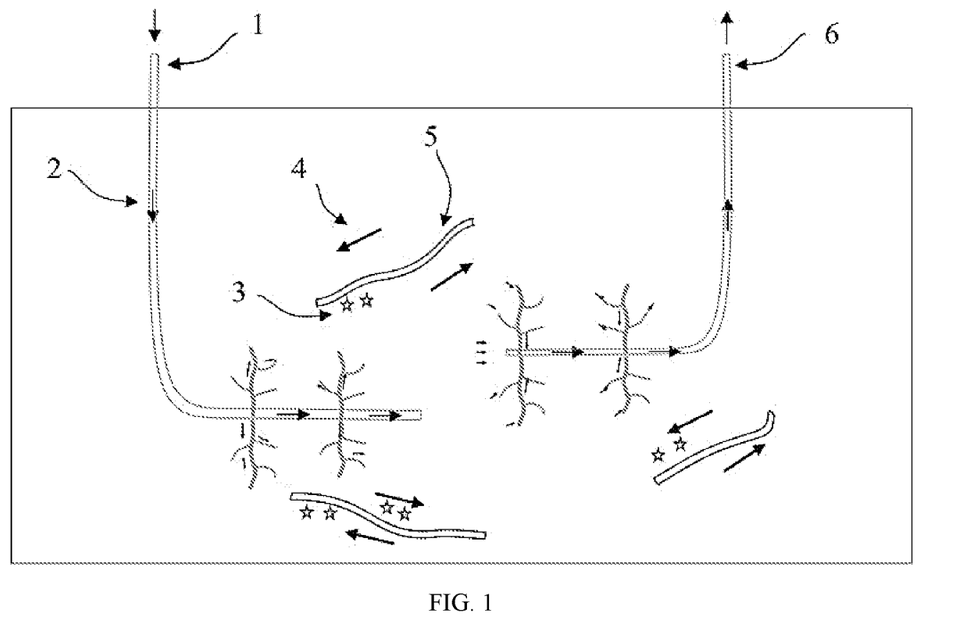
FIG. 1 is a schematic diagram of induced earthquake by hydraulic fracturing activated faults.

FIG. 1 provides a schematic diagram of hydraulic fracturing activated fault-induced earthquakes for embodiments of the invention. In this embodiment, the Wufeng-Longmaxi formation is selected as the evaluation unit (The Wufeng-Longmaxi Formation is one stratum). An induced earthquake evaluation method for hydraulic fracturing activated faults includes the steps S1 to S8.

Step S1, according to the geological structure type, fault distribution, fault size, work area size, injection well distribution, production well distribution, injection and production formation, the induced earthquake evaluation unit of hydraulic fracturing activated fault is determined.

As in this embodiment, the evaluation units are first divided according to the geological structure type of the work area. If the entire working area is a large anticlinal structure, then all evaluation units are within this anticlinal structure. Further, based on the fault distribution and fault size, according to the principle that the type IV faults are divided in the evaluation unit, the type I faults are divided outside the evaluation unit, the type II and III faults are mainly distributed outside the evaluation unit and a small number of faults are distributed inside the evaluation unit, the work area can be divided into three evaluation units. Further, the evaluation unit can be further refined according to the principle that 90% or more of the hydraulic fracturing fluid injection and production wells are distributed within the working area and the induced earthquake evaluation unit. Further, according to the principle that injection and production formation are the same or adjacent connected formation, the work area is divided into three induced earthquake evaluation units of hydraulic fracturing activated faults. As shown in Table 1:

TABLE 1

| NO | Name | Geological structure type | Fault distribution | Fault size | Injection well distribution | Production well distribution | Injection and production formation |
|---|---|---|---|---|---|---|---|
| 1 | Evaluation unit 1 | Anticline | The type III fault is distributed outside the evaluation unit, and the type IV fault is distributed inside the evaluation unit | There are three faults of the type III and five faults of the type IV | 93% of the wells were located within the evaluation unit | All wells are distributed within the evaluation unit | Wufeng-Longmaxi |
| 2 | Evaluation unit 2 | Anticline | The type III fault is distributed outside the evaluation unit, and the type IV fault is distributed inside the evaluation unit | There are three faults of the type III and eight faults of the type IV | All wells are distributed within the evaluation unit | 98% of the wells were located within the evaluation unit | Wufeng-Longmaxi |
| 3 | Evaluation unit 3 | Anticline | The type III fault is distributed outside the evaluation unit, and the type IV fault is distributed inside the evaluation unit | There are two faults of the type III and four faults of the type IV | 95% of the wells were located within the evaluation unit | 99% of the wells were located within the evaluation unit | Wufeng-Longmaxi |

Step S2, the cumulative injection equivalent energy W of hydraulic fracturing fluid is obtained according to the injection method, injection form, injection rate and cumulative injection amount of hydraulic fracturing fluid.

As in this embodiment, the hydraulic fracturing fluid in evaluation unit 1 was injected continuously with 65 wells. In the evaluation unit, three wells were continuously injected at the same time for a long time, with an average injection displacement of 18 m³/min for each well and a cumulative injection volume of 50,000-150,000 m³ per well. They have been continuously injected for 280 days. The hydraulic fracturing fluid in evaluation unit 2 was injected intermittently with 54 wells. Long-term intermittent injection of two wells at the same time, the average injection displacement of each well is 15 m³/min, and the cumulative injection volume of each well is 50,000-150,000 m³. They have been injected intermittently for 370 days. The hydraulic fracturing fluid in evaluation unit 3 was injected intermittently with 21 wells. Long-term intermittent injection of one well, the average injection displacement of per well is 15 m³/min, and the cumulative injection volume of a single well is 50,000-150,000 m³. They have been injected intermittently for 320 days. Formula 1 was used to obtain the cumulative injection equivalent energy W of the three evaluation units, as shown in Table 2.

$$W = \sum W_i = \sum (W_{ik} + W_{ip}) = \sum \frac{1}{2}\left[(m_i)\left(\frac{\partial y}{\partial t}\right)^2 + k_i\left(\frac{\partial y}{\partial x}\right)^2\right] \quad \text{(Formula 1)}$$

Where W is the cumulative injection equivalent energy, $W_{ik}$ is the kinetic energy of the i injected fluid, $W_{ip}$ is the elastic potential energy of the i injected fluid, $m_i$ is the mass of the i injected fluid, $k_i$ is the elastic potential energy coefficient of the i injected fluid.

When calculating the cumulative injection equivalent energy, the cumulative injection equivalent energy of continuous injection is multiplied by factor A, and the cumulative injection equivalent energy of multiple wells injected simultaneously is multiplied by factor B. In this embodiment, the evaluation unit 1 is continuous multi-well simultaneous injection, which is multiplied by factor A and then factor B in calculating the cumulative injected equivalent energy. The evaluation unit 2 is intermittent multi-well simultaneous injection, multiplied by factor B when calculating cumulative injected equivalent energy. The evaluation unit 3 is an intermittent 1-well injection that does not require multiplication of factors A and B.

$$\begin{cases} A = \dfrac{d}{2\ln^{d+1}} \\ B = \dfrac{n}{\ln^{3n}} \end{cases} \quad \text{(Formula 2)}$$

Where d is the number of continuous injection days and n is the number of wells injected simultaneously.

Step S3, the induced earthquake probability $P_1$ caused by fault type factors is obtained according to a fault type. The induced earthquake probability $P_2$ caused by distance factors of the hydraulic fracturing well and fault is determined according to the distance between hydraulic fracturing well and fault.

Figure 2:
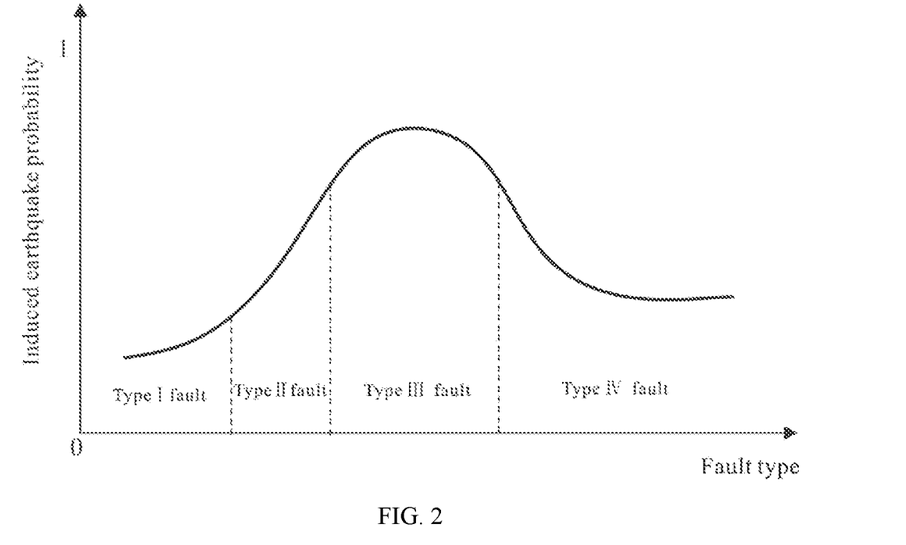
FIG. 2 is a schematic diagram of induced earthquake probability by different fault types in hydraulic fracturing in specific embodiments.
Figure 3:
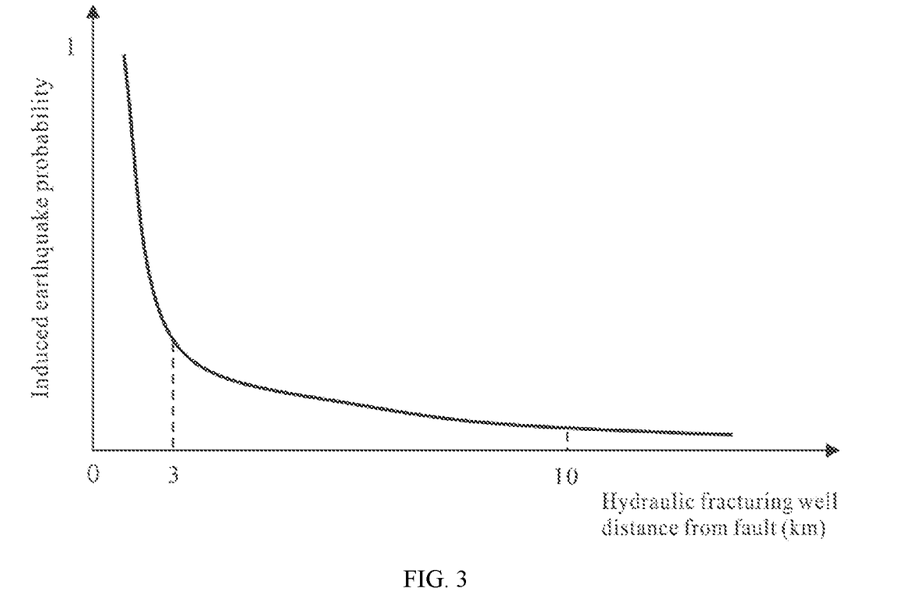
FIG. 3 is a schematic diagram of the induced earthquake probability by the distance between hydraulic fracturing wells and faults in specific embodiments,
In all the above figures, 1 is the hydraulic fracturing injection well, 2 is the injection fluid flow direction, 3 is the induced earthquake events, 4 is the fault strike, 5 is the fault, and 6 is the production well.

As in this embodiment, the evaluation unit 1, unit 2 and unit 3, the distribution and size of adjacent faults are shown in Table 1. The trend of induced earthquake probability $P_1$ caused by fault type factor is shown in FIG. 2, and the trend of induced earthquake probability $P_2$ caused by hydraulic fracturing well distance factor is shown in FIG. 3. In the evaluation unit 1, there are three faults of the type III and five faults of the type IV. The type III fault is distributed outside the evaluation unit, and the type IV fault is distributed inside the evaluation unit. On the basis of the induced earthquake probability of each fault type, combined with the weight of the number and distribution proportion of faults, the weighted average method can be used to obtain the induced earthquake probability $P_1$ of the fault type. In the evaluation unit 1, there are 65 hydraulically fractured wells. All hydraulically fracturing wells are spaced 1-3 km from the type IV fault and 3-10 km from the type III fault. Based on the probability of earthquake induced by each fault distance and combined with the weight of the number of wells of each distance type, the probability of earthquake induced by fault distance $P_2$ can be obtained. Similarly, combined with Table 1, there are 54 hydraulically fractured wells in the evaluation unit 2. 46 of the wells are separated from the type IV fault by 1 to 3 km. There are 8 wells with a distance of less than 1 km from the type IV fault and 3-10 km from the type III fault. There are 21 hydraulically fractured wells in the evaluation unit 3. The distance from the type IV fault is 1-3 km, and the distance from the type III fault is 3-10 km. According to FIG. 2 and FIG. 3, the fault type and fault distance induced earthquake probabilities $P_1$ and $P_2$ of the three evaluation units are shown in Table 2.

Step S4, according to rock porosity, comprehensive permeability and fracture development degree of hydraulic fracturing formation, the diffusion capacity D of hydraulic fracturing fluid in fractured formation (i.e., the hydraulic fracturing formation) is obtained.

As in this embodiment, the average porosity is 4.5%, the average comprehensive permeability is 0.25 millidarcy (mD), and other fractures did not develop except those newly generated by hydraulic fracturing in the evaluation unit 1. The average porosity is 4.2%, the average comprehensive permeability is 0.21 mD, and other fractures did not develop except those newly generated by hydraulic fracturing in the evaluation unit 2. The average porosity is 5.6%, the average comprehensive permeability is 0.31 mD, and other fractures did not develop except those newly generated by hydraulic fracturing in the evaluation unit 3. Formula 3 is used to obtain the diffusion capacity D of the three evaluation units, as shown in Table 2.

$$D = \frac{M \cdot P_d \cdot K}{\mu_1 (P_d + a^2 M)} \quad \text{(Formula 3)}$$

Where $$\alpha = 1 - \frac{K_d}{K_q}, \quad P_d = K_d + \frac{4}{3\mu_d}, \quad M = \frac{1}{\left(\dfrac{\phi}{K_f} + \dfrac{\alpha - \phi}{K_g}\right)},$$

D is the diffusion capacity, $K_f$ is the injected fluid volume modulus, $K_g$ is the rock skeleton volume modulus, $K_d$ is the rock mineral particle volume modulus, K is the formation rock permeability, $\phi$ is the formation rock porosity, $\mu_d$ is the formation rock skeleton shear modulus, $\mu_1$ is the injected fluid viscosity.

Step S5, the hydraulic fracturing fluid diffuses over the fault, weakening the effective stress on the fault. The new effective stress τ is determined according to the fluid pressure and the new mechanical characteristics of the fault.

As in this embodiment, the fluids in the evaluation unit 1, unit 2 and unit 3 did not percolate into the type III fault, but only penetrated into the type IV fault. The new effective stress of the three evaluation units after hydraulic fracturing are obtained by using formula 4, as shown in Table 2.

$$\tau = \mu(\sigma_n - P) + \tau_0 \quad \text{(Formula 4)}$$

Where $\mu$ is the internal friction factor of the fault, $\sigma_n$ is the vertical pressure of the fault, P is the fluid pressure at the fault, and $\tau_0$ is the fault polymerization strength.

Step S6, taking the induced earthquake evaluation unit as a whole, the average fluid pressure during injection and the original formation pressure before injection of all hydraulic fracturing injection wells are obtained, and the change rate of formation fluid pressure $\varepsilon$ is obtained.

As in this embodiment, the average injected fluid pressure of the evaluation unit 1, 2 and 3 is 105 MPa, 104 MPa and 95 MPa respectively, and the average original formation pressure of injected formation is 82 MPa, 85 MPa and 78 MPa respectively. The formation fluid pressure change rates of the three evaluation units after hydraulic fracturing are shown in Table 2.

injection equivalent energy W, fault type induced earthquake probability P1, fault distance induced earthquake probability P2, hydraulic fracturing fluid diffusion capacity D, effective fault stress $\tau$, formation fluid pressure change rate $\varepsilon$, and cumulative released equivalent energy E. The current probability P of induced earthquake by hydraulic fracturing activated fault of each of the three evaluation units is shown in Table 2.

$$P = f_1(P_1, P_2, \varepsilon) \cdot f_2(W-E, D, \tau) \quad \text{(Formula 6)}$$

Where $$f_1(P_1, P_2, \varepsilon) = \varepsilon \cdot (P_1 + P_2 + P_1 \cdot P_2), \quad f_2(W-E, D, \tau) = \frac{A_2 D}{\tau} e^{A_1(W-E)},$$

$A_1$ is the equivalent energy correction coefficient, $A_2$ is the hydraulic fracturing fluid diffusion energy correction coefficient in the formation rock.

TABLE 2

| NO | Name | Cumulative injection equivalent energy W (MW) | Fault type induced earthquake probability $P_1$ | Fault distance induced earthquake probability $P_2$ | Fluid diffusion capacity D | Effective fault stress of the type III fault $\tau$ (MPa) | Effective fault stress of the type IV fault $\tau$ (MPa) | Formation fluid pressure change rate $\varepsilon$ | Cumulative released equivalent energy E (MW) | Probability of induced earthquake by fault activation P |
|---|---|---|---|---|---|---|---|---|---|---|
| 1 | Evaluation unit 1 | 85995 | 0.5324 | 0.3246 | 0.4134 | 44.346 | 26.432 | 1.28049 | 34806 | 0.3456 |
| 2 | Evaluation unit 2 | 71442 | 0.6542 | 0.8765 | 0.3873 | 48.537 | 18.543 | 1.22353 | 24085 | 0.7894 |
| 3 | Evaluation unit 3 | 27783 | 0.4562 | 0.3426 | 0.4567 | 45.345 | 24.601 | 1.21795 | 8690 | 0.4032 |

Step S7, in the induced earthquake evaluation unit, the cumulative released equivalent energy E by hydraulic fracturing is obtained according to the cumulative fluid production time, production mode and production well distribution after hydraulic fracturing.

As in this embodiment, the producing wells in the evaluation unit 1, unit 2 and unit 3 are converted from injection wells after the completion of injection in the earlier stage. They are from injection wells to production wells. The wells in the three evaluation units are produced continuously and slowly. Production wells are located far from the fault (greater than 3 km).

Produced fluids include subsurface gas and injected fluids. The cumulative released equivalent energy E of each of the three evaluation units is obtained by using formula 5, as shown in Table 2.

$$E = \sum E_i = \sum C_1 \cdot C_2 \cdot C_3 \cdot \int \left( T \frac{\eta}{K_T} - P \right) dV \quad \text{(Formula 5)}$$

Where $C_1$ is the production mode correction coefficient which is obtained through the work area experience chart query. $C_2$ is the production speed correction coefficient which is obtained through the work area experience chart query. $C_3$ is the production location correction coefficient which is obtained through the work area experience chart query. $\eta$ is the volume expansion coefficient, $K_T$ is the isothermal compression coefficient, T is the temperature, P is the fluid pressure.

Step S8, finally, the formula 6 is used to calculate the induced earthquake probability based on the cumulative This embodiment is an embodiment of several evaluation units within a work area. A unit of work or a specific area, a well or several wells may also be evaluated individually in the implementation. The induced earthquake probability of hydraulic fracturing activated faults of different evaluation objects can be realized from step S2 to step S8 without step S1. In addition, the induced earthquake probability of dynamic hydraulic fracturing activated fault in different stages of the evaluation object can be obtained by conducting evaluation at different stages of hydraulic fracturing or production.

The above is only the preferred embodiment of the invention, and the scope of protection of the invention is not limited to the above embodiment. For those skilled in the art, any modification, equivalent replacement, improvement, etc. made without deviating from the technical conception of the invention shall be included in the scope of protection of the invention.

What is claimed is:

1. An induced earthquake evaluation method for hydraulic fracturing activated faults, comprising:
   step S1, obtaining an induced earthquake evaluation unit for hydraulic fracturing activated faults according to a geological structure type, a fault distribution, a fault size, a work area size, an injection well distribution, a production well distribution, injection and production formations;
   wherein the geological structure type is one selected from anticline, syncline and a fault structure among a medium structure and following structure types; the fault distribution is obtained in relation to a relative location of hydraulic fracturing injection wells and production wells; the fault size is obtained by fault grade; the induced earthquake evaluation unit is not larger than an area of a working area, and is distributed in second and third grade faults of the working area; more than 90% of hydraulic fracturing fluid injection and production wells are located in the working area and the induced earthquake evaluation unit; the injection and production formations are the same or adjacent connected formation;

step S2, obtaining a cumulative injection equivalent energy W of hydraulic fracturing fluid according to an injection method, an injection form, an injection rate and a cumulative injection amount of hydraulic fracturing fluid; wherein a formula for calculating the cumulative injection equivalent energy W is as follows:

$$W = \sum W_i = \sum (W_{ik} + W_{ip}) = \sum \frac{1}{2}\left[(m_i)\left(\frac{\partial y}{\partial t}\right)^2 + k_i\left(\frac{\partial y}{\partial x}\right)^2\right]$$

where W is the cumulative injection equivalent energy, $W_{ik}$ is a kinetic energy of an i injected fluid, $W_{ip}$ is an elastic potential energy of the i injected fluid, $m_i$ is a mass of the i injected fluid, $k_i$ is an elastic potential energy coefficient of the i injected fluid;

wherein a cumulative injected equivalent energy for continuous injection is multiplied by a factor A, and a cumulative injected equivalent energy for simultaneous injection of multiple wells is multiplied by a factor B; and formulas for calculating the factors A and B are as follows:

$$\begin{cases} A = \dfrac{d}{2\ln^{d+1}} \\ B = \dfrac{n}{\ln^{3n}} \end{cases}$$

where d is a number of continuous injection days and n is a number of wells injected simultaneously;

step S3, obtaining an induced earthquake probability $P_1$ caused by fault type factors according to a fault type; and obtaining an induced earthquake probability $P_2$ according to a distance between hydraulic fracturing well and fault;

step S4, obtaining a diffusion capacity D of hydraulic fracturing fluid in a fractured formation according to rock porosity, a comprehensive permeability and a fracture development degree of hydraulic fracturing formation; and a formula for obtaining the diffusion capacity D is as follows:

$$D = \frac{M \cdot P_d \cdot K}{\mu_1 (P_d + a^2 M)}$$

where $$\alpha = 1 - \frac{K_d}{K_q},\ P_d = K_d + \frac{4}{3\mu_d},\ M = \frac{1}{\left(\dfrac{\phi}{K_f} + \dfrac{\alpha - \phi}{K_g}\right)},$$

D is the diffusion capacity, $K_f$ is injected fluid volume modulus, $K_g$ is rock skeleton volume modulus, $K_d$ is rock mineral particle volume modulus, K is a formation rock permeability, $\phi$ is formation rock porosity, $\mu_d$ is formation rock skeleton shear modulus, $\mu_1$ is injected fluid viscosity;

step S5, obtaining an effective stress τ according to a fluid pressure and mechanical characteristics of faults; wherein hydraulic fracturing fluid diffuses over faults, weakening an effective stress on the faults; and the effective stress τ is obtained by the following formula:

τ=μ($\sigma_n$−P)+$\tau_0$ where μ is an internal friction factor of the faults, $\sigma_n$ is an vertical pressure of the faults, P is a fluid pressure at the faults, and $\tau_0$ is a fault polymerization strength;

step S6, taking the induced earthquake evaluation unit as a whole, obtaining an average fluid pressure during injection and an original formation pressure before injection of all hydraulic fracturing injection wells, and obtaining a change rate ε of formation fluid pressure;

step S7, in the induced earthquake evaluation unit, obtaining a cumulative released equivalent energy E by hydraulic fracturing according to cumulative fluid production time, a production method and a production well distribution after hydraulic fracturing; and a formula for calculating the cumulative released equivalent energy E is as follows:

$$E = \sum E_i = \sum C_1 \cdot C_2 \cdot C_3 \cdot \int \left(T\frac{\eta}{K_T} - P\right)dV$$

where $C_1$ is a production mode correction coefficient, $C_2$ is a production speed correction coefficient, $C_3$ is a production location correction coefficient, η is a volume expansion coefficient, $K_T$ is an isothermal compression coefficient, T is a temperature, P is the fluid pressure;

step S8, in the induced earthquake evaluation unit, obtaining an induced earthquake probability P according to the accumulative injection equivalent energy W, the induced earthquake probability P1 by the fault type, the induced earthquake probability P2 by the fault distance, the diffusion capacity D of hydraulic fracturing fluid, the effective stress τ, the change rate ε of formation fluid pressure, and the accumulative released equivalent energy E; wherein the induced earthquake probability P is obtained from the following formula:

P=$f_1$($P_1$,$P_2$,ε)·$f_2$(W−E,D,τ)

where $$f_1(P_1, P_2, \varepsilon) = \varepsilon \cdot (P_1 + P_2 + P_1 \cdot P_2),\ f_2(W - E, D, \tau) = \frac{A_2 D}{\tau} e^{A_1(W-E)},$$

$A_1$ is an equivalent energy correction coefficient, $A_2$ is a hydraulic fracturing fluid diffusion energy correction coefficient in a formation rock.

2. The induced earthquake evaluation method for hydraulic fracturing activated faults as claimed in claim 1, wherein the injection method of the hydraulic fracturing fluid in step S2 includes continuous injection and intermittent injection; and the injection form includes single-well injection and multi-well simultaneous injection.

3. The induced earthquake evaluation method for hydraulic fracturing activated faults as claimed in claim 1, wherein in step S3, the fault type factors are divided, according to the induced earthquake probability $P_1$, into four categories: type III fault, type IV fault, type II fault and type I fault; an induced earthquake probability of the type III fault greater than an induced earthquake probability of the type IV fault greater than an induced earthquake probability of the type II fault greater than an induced earthquake probability of the type I fault; the distance between hydraulic fracturing well and fault is divided, according to the induced earthquake probability $P_2$, into four categories: a distance less than 1 kilometer (km), a distance of 1-3 km, a distance of 3-10 km, and a distance greater than 10 km; an induced earthquake probability of the distance less than 1 km greater than an induced earthquake probability of the distance of 1-3 km greater than an induced earthquake probability of the distance of 3-10 km greater than an induced earthquake probability of the distance greater than 10 km.

4. The induced earthquake evaluation method for hydraulic fracturing activated faults as claimed in claim 1, wherein in step S5, the hydraulic fracturing fluid diffuses into the faults, a fluid pressure increases at the faults, a friction factor and a polymerization strength decrease, which results in an effective stress change.

5. The induced earthquake evaluation method for hydraulic fracturing activated faults as claimed in claim 1, wherein in step S7, the production method includes continuous production and intermittent production, a production speed includes rapid production after hydraulic fracturing injection and slow production after hydraulic fracturing; and production locations include production less than 3 km from faults and production greater than 3 km from faults.

* * * * *